United States Patent
Lau

(10) Patent No.: US 7,027,250 B2
(45) Date of Patent: Apr. 11, 2006

(54) MAGNETIC TAPE HEAD WITH THINFILM THERMOSENSORS FOR HEAD-MEDIA INTERFACE TEMPERATURE MONITORING

(75) Inventor: Ming Ho Lau, Superior, CO (US)

(73) Assignee: Quantum Corporation, San Jose, CA (US)

( * ) Notice: Subject to any disclaimer, the term of this patent is extended or adjusted under 35 U.S.C. 154(b) by 510 days.

(21) Appl. No.: 10/150,676

(22) Filed: May 17, 2002

(65) Prior Publication Data

US 2003/0214745 A1 Nov. 20, 2003

(51) Int. Cl.
G11B 33/14 (2006.01)

(52) U.S. Cl. .......................... 360/69; 360/71; 360/128

(58) Field of Classification Search ................. 360/69, 360/128, 129, 221, 241.1, 126, 67, 68, 71, 360/73.05, 73.08, 75
See application file for complete search history.

(56) References Cited

U.S. PATENT DOCUMENTS

| | | | | |
|---|---|---|---|---|
| 4,492,997 A | * | 1/1985 | Arai et al. ..................... 360/67 |
| 5,148,329 A | * | 9/1992 | Yamauchi et al. ............. 360/68 |
| 5,313,343 A | * | 5/1994 | Yatomi ..................... 360/73.05 |
| 5,455,717 A | | 10/1995 | Van Doorn et al. ............. 360/6 |
| 5,739,970 A | | 4/1998 | Kobayashi et al. ............ 360/75 |
| 5,774,293 A | * | 6/1998 | Stupp ........................... 360/75 |
| 5,886,713 A | | 3/1999 | Okada et al. |
| 5,963,400 A | | 10/1999 | Cates et al. .................. 360/317 |
| 6,037,645 A | | 3/2000 | Kreider ....................... 257/467 |
| 6,072,165 A | | 6/2000 | Feldman ...................... 219/543 |
| 6,092,926 A | | 7/2000 | Still et al. |
| 6,141,184 A | | 10/2000 | Daly |
| 6,147,830 A | | 11/2000 | Kobayashi et al. ....... 360/73.07 |
| 6,172,834 B1 | * | 1/2001 | Newton .................... 360/73.08 |
| 6,191,917 B1 | | 2/2001 | Dee et al. |
| 6,288,870 B1 | | 9/2001 | Saliba |
| 6,349,020 B1 | | 2/2002 | Kasetty |
| 6,493,174 B1 | * | 12/2002 | Stubbs ..................... 360/77.12 |
| 2001/0012169 A1 | | 8/2001 | Kobayashi et al. ......... 360/72.3 |

FOREIGN PATENT DOCUMENTS

EP 0 624 867 A2 11/1994

(Continued)

OTHER PUBLICATIONS

"Head Wear Sensors," Mar. 1, 1981, IBM TDB, vol. 23, No. 10, p. 4702.*

(Continued)

Primary Examiner—David Hudspeth
Assistant Examiner—James L Habermehl
(74) Attorney, Agent, or Firm—Morrison & Foerster LLP

(57) ABSTRACT

A thinfilm magnetic head for tape drives that enables onsite, real time temperature monitoring of the head-media interface. The head includes a media interface contacting a data bearing surface of the tape. A thinfilm, read-write element and a thinfilm sensor of a thermosensor are positioned on the head-media interface. The thermosensor generates a signal based on the temperature of the media interface. The media interface includes an active island and an optional inactive island positioned transverse to the tape travel path with the read-write element in the active island. The sensor may be placed on the inactive island or on the active island adjacent the read-write element. In one embodiment, a plurality of read-write elements and thermosensors are provided and sensors of the thermosensors are positioned on the inactive island and/or the active island among or between the read-write elements or adjacent an end element.

30 Claims, 5 Drawing Sheets

FOREIGN PATENT DOCUMENTS

| JP | 01138601 A | * | 5/1989 |
| JP | 02083841 A | * | 3/1990 |
| JP | 2001250371 A | * | 9/2001 |

OTHER PUBLICATIONS

Thin Film Device Fabrication, Design and Fabrication, San Diego Magnetics, http://www.sdmagnetics.com/serv/thinfilm/devices.html, Mar. 15, 2002, pp. 1-2.

Thin Film Device Fabrication, Services, San Diego Magnetics, http://www.sdmagnetics.com/serv/thinfilm/thinfilm.html, Mar. 15, 2002, pp. 1-2.

DLTtape System Technology Compared, Quantum DLTtape Handbook, pp. 11.1-11.12.

Metal Evaporated (ME) Tape Versus Metal Particulate (MP) Tape: Possibility Versus Proven Durability, Quantum Corporation, 1998, pp. 1-5.

SuperDLTtape Technology, Extending the Standard, Quantum Corporation, www.DLTtape.com/super, 2000, pp. 1-9.

High-density recording in magnetic tape, http://utep.el.utwente.nl/smi.content/tape/tape.html, Mar. 15, 2002, p. 1.

Head-Media Interface, http://itri.loyola.edu/hdmem/04_06.htm, Mar. 15, 2002, p. 1.

Glossary of PC terms: H, http://www.usbyte.com/common/glossary_H.htm, Mar. 15, 2002, p. 1.

Glossary of PC terms: P, http://www.usbyte.com/common/glossary_P.htm, Mar. 15, 2002, p. 1.

Glossary of PC terms: T, http://www.usbyte.com/common/glossary_T.htm, Mar. 15, 2002, p. 1.

* cited by examiner

MAGNETIC TAPE HEAD WITH THINFILM THERMOSENSORS FOR HEAD-MEDIA INTERFACE TEMPERATURE MONITORING

BACKGROUND OF THE INVENTION

1. Field of the Invention

The present invention relates, in general, to magnetic tape head assemblies for use in conjunction with magnetic recording media such as tape, and more particularly to thinfilm tape heads including one or more thinfilm thermosensors on active or inactive islands for sensing operating temperatures at the interface between the tape head islands, where read and write elements are located, and the moving tape (e.g., the media interface).

2. Relevant Background

Data storage on tape accounts for a large portion of the sales of data storage products. In part, this is a result of the continuous improvement of recording media (i.e., tape) and read/write heads to try to increase magnetic tape drive performance and capacity. The data-bearing side of the media or tape is typically composed of microscopic magnetic particles dispersed in a polymeric binder and coated onto a flexible substrate. Recent improvements in tape have been achieved through the use of advanced metal power technologies and through the use of metal evaporation.

Recently, advanced thinfilm processing technology has been used to fabricate densely packed magnetoresistive tape heads (sometimes called magnetoresistive cluster (MRC) heads) to obtain higher data transfer rates and greater data density than traditional ferrite and metal heads which generally have comparatively bigger size. Tape heads typically contain one or more raised strips or islands that have surfaces over which the magnetic recording media, e.g., tape, passes. Embedded in active islands are transducers which may be recording transducers (i.e., recording or writing elements) for writing information (i.e., bits of data) onto the media or reproducing transducers (i.e., reproducing or reading elements) for reading information from the media. An embedded recording transducer produces a magnetic field in the vicinity of a small gap in the core of the recording transducer that causes information to be stored on the magnetic media as it streams across the support surface. In contrast, a reproducing transducer detects a magnetic field near the surface of the magnetic media in the vicinity of a small gap as the media streams over the support surface. Lead and follow inactive islands are often optionally provided for initially contacting the tape to create a desired wrap angle or control the contact at the active islands. The inactive islands also provide sharp edges to scrape away any unwanted magnetic or non-magnetic particles prior to the particles contacting the read/write elements. The contact and partial-contact surfaces on both active and inactive islands form a contour tape bearing surface (TBS).

There is typically some microscopic separation between the gap of the transducer core and the recording media. During operation, this separation must be tightly monitored and controlled to minimize "spacing loss." The separation reduces the magnetic field coupling between the recording transducer and the media during writing and between the media and the reproducing transducer during reading. While a higher, more easily obtainable amount of head-to-media separation may be acceptable at low recording densities, the growing demand for higher recording densities has led to the need for tighter control over the head-to-media separation that can be tolerated to obtain useful levels of magnetic coupling. To control spacing loss, a tension is applied to the tape as the tape passes at a wrap angle around a support surface or head island. Due to this tension, the tape exerts a pressure against the head island and the ongoing friction causes heat to be generated and the temperature of the island and tape to increase. In some tape head assembly designs, the pressure is intentionally increased to control spacing loss which, in turn, increases the contact zone and friction at the media interface.

While thinfilm heads provide enhanced transfer rates and other operating improvements, the temperature of the interface between the head and media or simply the temperature of the head has proven difficult to monitor during operations. The head and/or interface operating temperature needs to be monitored. If the temperature becomes too high (such as about 50° C. but varying with head and tape materials and fabricating techniques), a loss of thermal stability or thermal degradation of the head and media properties may occur and result in deposition of materials from the media on the head surface and/or degradation of mechanical and magnetic properties of the media. Even when actual degradation does not occur, high temperature operations may result in reduced tape and head durability and a shorter operating life.

During operation, the magnetic media flies rapidly over the tape head which causes contact and partial contact between the head islands and the tape resulting in frictional heat. The amount of frictional heat depends on a number of factors including the wrap angle distribution, the composition and roughness of the media and the islands, the tape tension, and the tape speed. While the tape is moving, air is also being dragged between the tape and head surfaces cooling the tape and head. The rate of air flow also depends upon a number of factors including speed of a cooling fan in the tape drive, tape speed, head contour, and shape and configuration of the tape head vicinity. In addition, electrical currents are passed through the head elements which cause the elements to be resistively and inductively heated and, the amount of operating current is often increased in attempts to obtain higher output to facilitate higher storage densities and better error rates. Further, cooling fans used within tape drive enclosures may not be able to keep operating temperatures at desired levels and the "cooling" air flowing in the interface may be above room temperature. Due to the number and complexity of the heating and cooling parameters, modeling, such as mathematical heat transfer and finite element simulation, have not proven particularly useful in predicting operating temperature at the head-media interface.

Prior attempts to physically monitor operating temperatures have been ineffective at measuring the temperature at the head-media interface. Conventional thermosensors have been used but have not provided an accurate onsite measurement of the interface temperature. Conventional thermosensors are relatively large and cumbersome relative to the size of the thinfilm magnetoresistive head, which makes it difficult to position a conventional thermosensor at a location that provides useful head-media interface temperature measurements. With the tape flying over the TBS, the tape blocks access to the interface. Lack of access to the actual interface area also causes problems when thermal imaging is used to try to monitor the head or interface temperatures. The thermal image can be used to obtain temperatures on the non-data bearing or back side of the tape but not of the data bearing side and not of the head-media interface temperature.

Hence, there remains a need for an improved method and/or system for monitoring the temperature at the interface between a tape head and a magnetic media. Such a thermal stability or interface temperature monitoring method and system preferably would be configured to provide real-time feedback or sensing of onsite temperatures on the islands of thinfilm magnetoresistive heads during the operation of a tape drive. Additionally, such a method and system would be compatible with manufacturing processes used for producing the head and tape drive utilizing the head.

SUMMARY OF THE INVENTION

The present invention addresses the above discussed and additional problems by providing a magnetic tape head with one or more individual or integrated thermosensors. In one embodiment, the tape head is a thinfilm magnetic tape head and the thermosensors are also fabricated using thinfilm processes to provide built-in or integrated thermosensors in the head near read/write elements. The quantity and location of the thermosensors relative to the read/write elements may be widely varied to practice the invention. For example, a typical head includes one or more active islands holding the read/write elements and contacting the tape and optionally, includes two or more inactive islands without read/write elements next to the active islands for contacting the tape to provide controlled wrap angles to the active islands. The thinfilm thermosensors may be positioned on either or both of these islands and when placed on the active island, may be positioned at any desirable location. For example, the thinfilm thermosensors can be integrated with electrical lapping guides within the same cluster, or manufactured with different thinfilm material layers when epoxy bonding is used to form structural head islands, or integrated among the read/write elements and having at least some of the same material layers as the read/write elements.

The thermosensors are configured for use in a tape drive for sensing the real time operating temperature of the head at the interface between the head and media or tape. A monitoring instrument is linked to the thermosensors for providing signals representing the sensed temperatures to a drive controller. The drive controller responds to the sensed interface temperature by determining if a maximum operating temperature point or range has been reached (such as about 50° C. or lower but depending on the media and head materials and design), and if so, operating the tape drive components to reduce the temperature (such as by increasing cooling fan speed, lowering read/write currents, reducing tape tension, or reducing the motors controlling tape speed) or to temporarily shutdown the tape drive to avoid tape or head damage or data loss.

More particularly, a thinfilm magnetic head with thermosensors is provided for use with magnetic tape that enables onsite, real time temperature monitoring. The head includes a media interface contacting a data bearing surface of the tape as the tape is moved over the TBS along a tape travel path. A thinfilm transducer element for reading and/or writing to the tape is positioned on the head-media interface. Additionally, a thermosensor is provided in the head with a thinfilm sensor positioned in the head-media interface operating to generate a signal based on the temperature of the head-media interface. In one embodiment, the head-media interface includes an elongated active island positioned transverse to the tape travel path and holding the transducer element and an elongated inactive island also positioned transverse to the tape travel path for contacting the data bearing surface of the tape path to obtain a desired wrap angle. In one embodiment, the thinfilm sensor of the thermosensor is placed on the inactive island. In another embodiment, the thinfilm sensor is placed on the active island. Additional transducer elements may be provided on the active island with the sensor positioned between two of the elements or adjacent or on an end of the transducer elements. The sensor may be manufactured as part of the same thinfilm processes used to produce the reproducing transducer element thereby having thinfilm layers adjacent the elements with like materials or may be produced using separate thinfilm processes with like or differing thinfilm material layers and then later bonded onto the head.

DETAILED DESCRIPTION OF THE PREFERRED EMBODIMENTS

The present invention provides real-time temperature monitoring within a tape drive at the interface between the moving media and the tape head. Briefly, this is achieved utilizing micro thinfilm thermosensors positioned on active or inactive islands of a multi-island, thinfilm magnetic tape head. The thermosensors can be thinfilm resistance temperature detectors (RTDs), thinfilm thermocouples, or other thinfilm temperature sensing devices, with RTD-type thermosensors being illustrated for clarity in FIGS. 1–6. The inventor recognized the need for accurate thermal stability monitoring of the head-media interface to protect data and extend media and head operating life, but also recognized the limitations of measuring head operating temperatures with conventional thermosensors that due to size and media coverage of the interface had to be positioned external to the head and the interface and the problems with thermal imaging which typically only filmed the backside of the tape and the portions of the head not covered by the tape. In this regard, the present invention provides on-site measurement of head and/or interface temperatures and provides a tape head that operates in response to such sensed operating temperatures to significantly reduce risks of media or head damage due to undesirably high interface temperatures and/or low humidity where the cooling effect from moving air is diminished significantly.

The invention is described in the following discussion as being particularly useful as part of a linear tape drive utilizing thinfilm magnetic tape heads for performing read and write on magnetic media (such as magnetic particle tape). However, those skilled in the art will understand that the temperature stability monitoring taught by the following description for thinfilm tape heads may be utilized with or without modifications in other types of magnetic recording heads in which it is useful to protect transducer read and write elements and recording media from wear or degradation that may be caused or increased by high operating temperatures. Additionally, the magnetic media discussed for use with the invention is magnetic recording tape, but the invention may be useful with other magnetic storage media such as hard disks, floppy disks, and the like.

Figure 1:
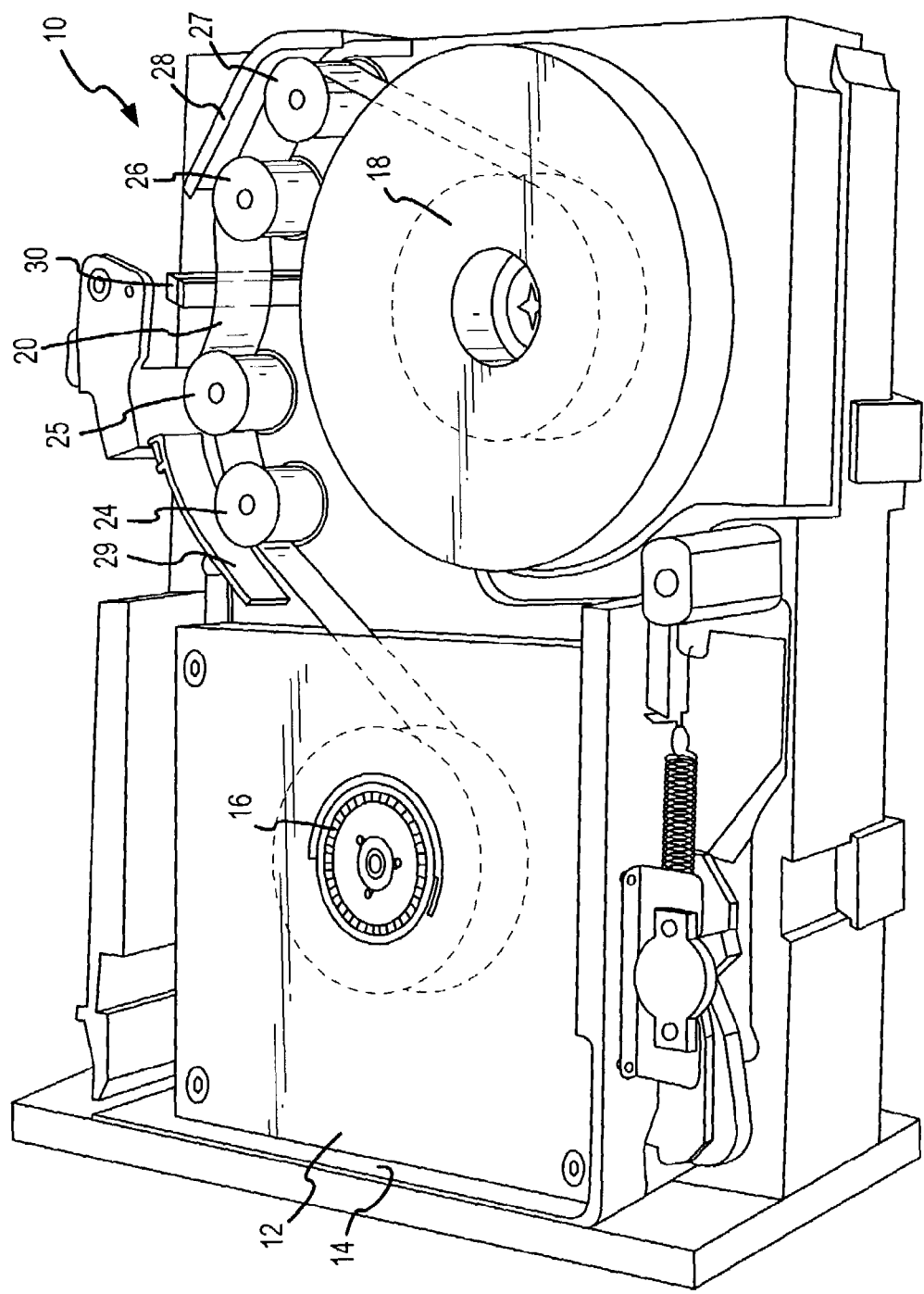
FIG. 1 is a perspective, cut-away view of a magnetic tape drive according to the invention in which a thinfilm tape head with thinfilm thermosensors according to the invention is implemented and well-suited.

FIG. 1 illustrates a cut-a-way view of a magnetic tape drive 10 in which the thermal stability monitoring of the head-media interface is particularly useful. The particular arrangement of the drive 10 is not as important as the arrangement and configuration of the tape heads but is provided for completeness of the operating environment for the tape heads and to facilitate description of how the temperature monitoring information can be utilized to control the operation of a tape drive. The tape drive 10 includes a tape cartridge 12 inserted into a receiver 14. The tape drive 10 includes a motor (not shown) which drives a cartridge supply reel 16 and moves the tape 20 at a particular speed (e.g., a feed speed and tension which can be altered to control the amount of frictional heat generated at the monitored media interface). The drive 10 also includes a second motor (not shown) which drives a take-up reel 18 and which may be controlled in response to sensed interface or head temperatures. Proper balance of the opposing forces of the two motors produces the required tension on a magnetic tape 20 and also produces tape motion either in or out of the cartridge 12. The tape 20 may be driven in either a forward direction or a reverse direction to write data onto or read data from the tape as controlled by a motor controller circuit (not shown in FIG. 1 but typically provided on one or more printed circuit boards and shown functionally in FIG. 5 as tape drive controller 540). The controller may also be adapted for controlling cooling fan (not shown) speeds and magnitudes of read/write currents passed through the head 30. The tape 20 is guided by a plurality of tape guide assemblies 24–29 between the take-up reel 18 and the cartridge 12 and past a thinfilm magnetic tape head 30 including thinfilm thermosensors for monitoring head or interface operating temperatures (as explained in more detail with reference to FIGS. 2–5).

Figure 2:
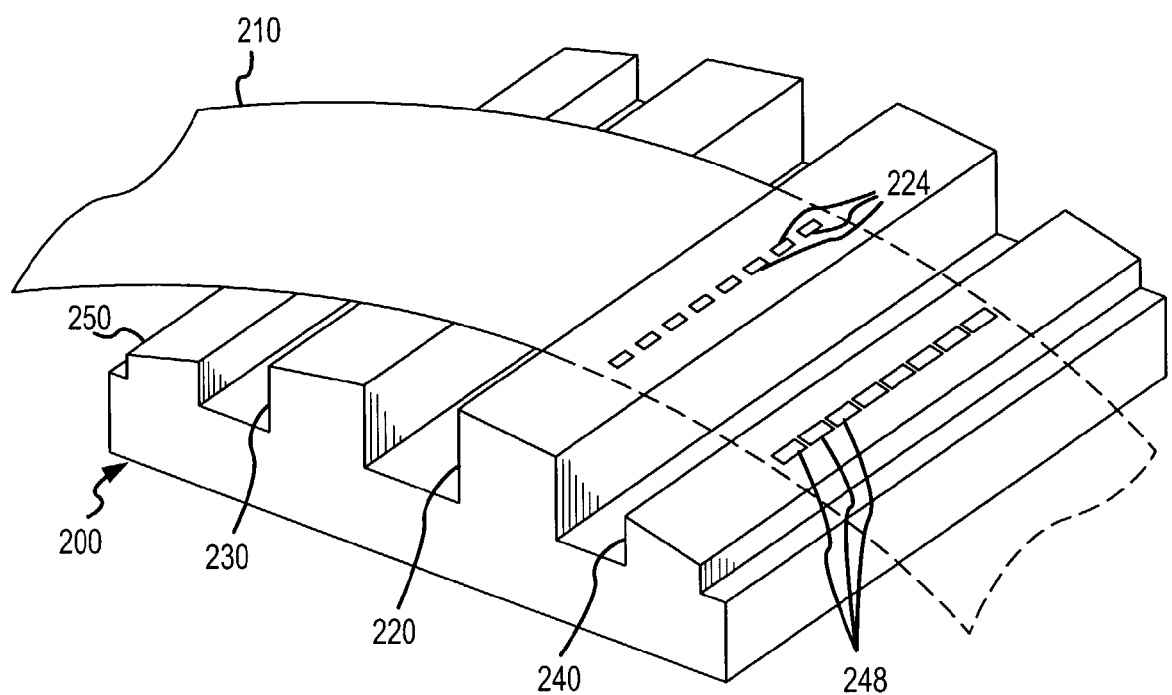
FIG. 2 is an enlarged perspective view of one embodiment of a tape head that may be used with the tape drive of FIG. 1 illustrating positioning of thermosensors in an inactive island of the tape head.

FIG. 2 illustrates a tape head 200 incorporating the thermal stability monitoring features of the invention. As shown, the head 200 is adapted for contacting media, such as magnetic particle tape that typically has a width ranging from 5 to 20 millimeters, during operations of a tape drive, such as a digital linear tape drive like the drive 10 of FIG. 1. To enable reading and writing from and to the tape 210, the head 200 includes active islands 220 and 230 having read/write elements 224. The accuracy and stability of the read and write processes are controlled in part by a set of wrap angles that is useful for controlling contact between the tape 210 and the active islands 220, 230. To increase the accuracy and stability of providing the wrap angles, the head 200 includes inactive islands 240, 250 that do not include and read/write elements but instead according to one embodiment of the invention include thinfilm thermosensors 248 for sensing the temperature at the head-media interface.

In the illustrated embodiment of head 200, a like number of thermosensors 248 are provided in the inactive island 240 as the number of read/write elements 224. Additionally, as shown, the thermosensors 248 are positioned within island 240 to be aligned with an adjacent one of the elements 224 so as to contact about the same linear area on the tape 210. In this fashion, the thermosensors 248 are expected to become heated to a temperature that is the same or approximates the temperature of the adjacent or paired one of the read/write elements 224. This is useful because the contact experienced across the islands 220, 240 may vary causing differing interface temperatures. The use of multiple thermosensors also enables a temperature profile to be determined across the island 240 (e.g., transverse to the tape travel path and in many cases, substantially perpendicular to the tape travel path). Of course, in other embodiments (not shown), the number of thermosensors 248 utilized may differ from the number of elements 224 being less or greater than the number of elements 224 and the thermosensors 248 may be unaligned with the elements 224. For example, a single thermosensor 248 may be adequate for interface temperature monitoring with the location of the thermosensor 248 being anywhere on the island 240 to contact the tape 210.

Figure 4:
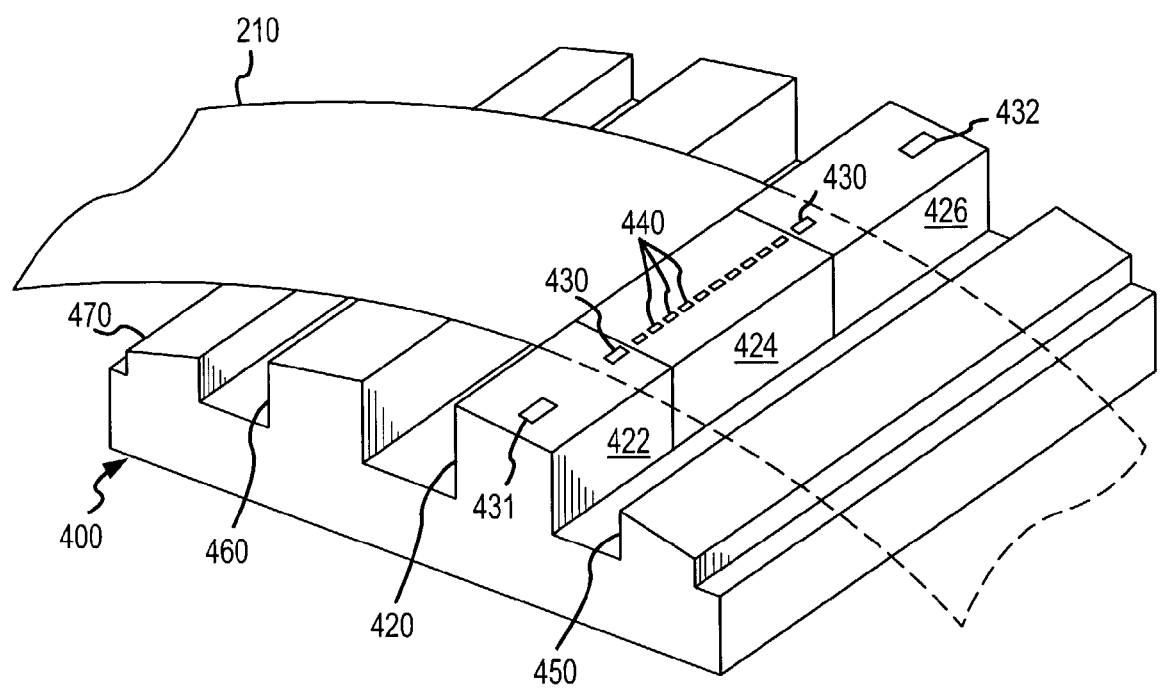
FIG. 4 is a view similar to FIGS. 2 and 3 of yet another embodiment of a tape head according to the invention illustrating positioning of thermosensors on ends or edges of an active island of the tape head so as to contact the media but facilitating separate fabrication of read/write elements and thermosensors and positioning additional thermosensors on a portion of the active (or inactive) islands outside of the head-media interface to provide a reference working environment temperature measurement.

The fabrication of the head 200 may be performed utilizing any of a number of thinfilm techniques previously developed and well known in the arts or techniques that are still being developed. For example, thinfilm heads, such as head 200, are fabricated in clean rooms using vacuum or physical vapor deposition methods (such as RF or DC magnetron sputtering, RF or DC diode sputtering, RF or DC triode sputtering) and ion beam deposition, batch photolithographic methods (such as photoresist masking, coating, and developing), chemical assisted and reactive ion-beam etching, photoresist stripping and etching that allow for very small head and element dimensions and precise positioning and alignment of multiple transducer elements (such as elements 224). The slots or separation of the islands 220, 240 can be achieved using laser trimming, precision grinding, or other machining techniques. Each island, such as island 220 or 240, may be fabricated by encapsulating layers of materials (as is described with reference to FIG. 6) within two or more substrate materials followed by lapping or fine polishing to achieve a desired media contact contour and surface. Alternatively, each island may be fabricated of several segments or portions that are then epoxy-bonded together to create the elongated islands (as is shown in FIG. 4). The media contact surface may be coated with a corrosion or wear resistant thin layer to protect the read/write elements and thermosensors.

The resulting active island 220 generally includes the read/write elements 224 and is made of thin layers of different materials (such as metal alloys and insulating materials). The head 200 may be configured to be a thinfilm inductive head, a thinfilm anisotropic MR head, a dual MR head, an integrated thinfilm inductive write and MR or GMR read head, or other thinfilm head design. The inactive island 240 may be fabricated in a similar fashion to the active island 220 using similar materials for the thermosensors 248 or using different materials. Alternatively, the inactive island 240 may be bonded to the head 200 and formed in differing thinfilm processes.

The number of thinfilm layers utilized in the elements 224 and the thermosensors 248 and the make-up of each layer may be varied to successfully practice the invention. For example, the elements 224 and thermosensors 248 may be fabricated with insulating layers (such as alumina) and top and bottom layers or magnetic poles of cobalt-zirconium-tantalum (CZT), which is commonly used in thinfilm heads and for which, manufacturing processes are well understood by those in the arts. Poles and shields fabricated using at least one of cobalt, nickel, and iron are also useful for fabricating the elements 224 and thermosensors 248. The base substrate upon which the elements 224 and thermosensors 248 are built may be ferrite, aluminum oxide titanium carbide (AlTiC) or other materials. The specific materials or fabrication processes use to manufacture the head 200 is not limiting with thermosensor materials and manufacturing being selected for compatibility with the read/write elements especially when thermosensors are positioned within an active island and adjacent read/write elements (see FIGS. 3 and 4).

Figure 5:
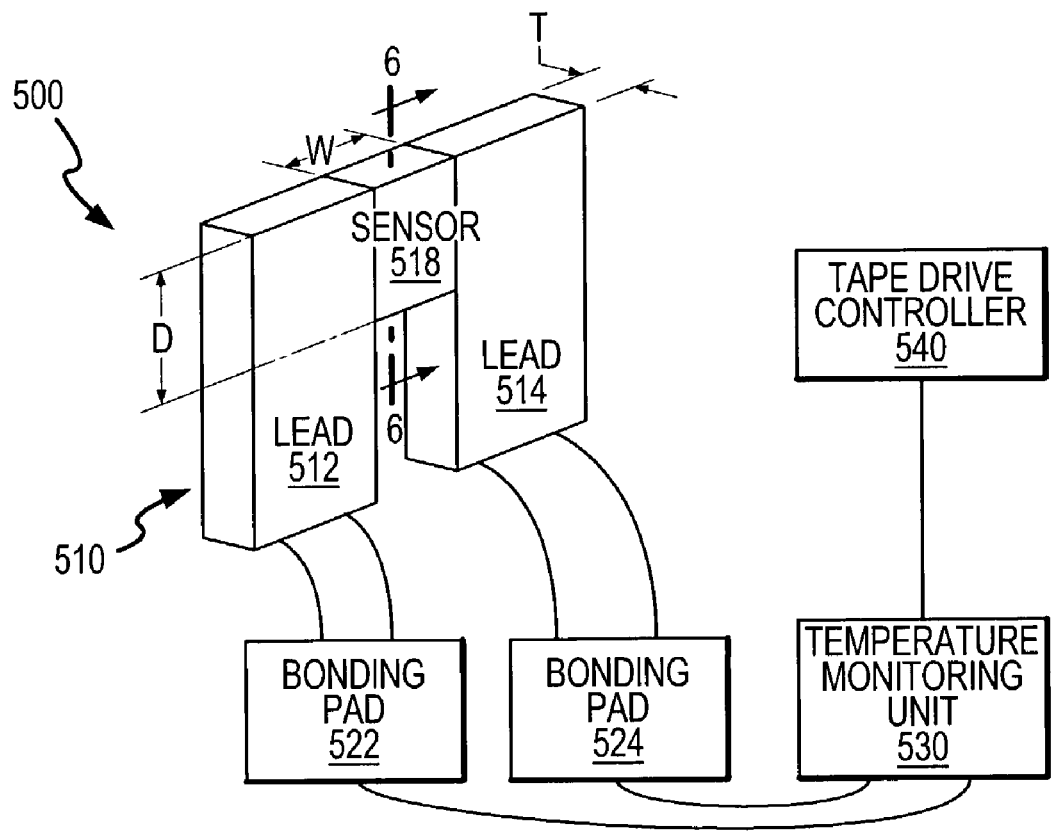
FIG. 5 is an enlarged perspective view of a thermosensor such as those used in the tape heads of FIGS. 2–4 within and outside a head-media interface temperature monitoring and feedback system of the invention.
Figure 6:
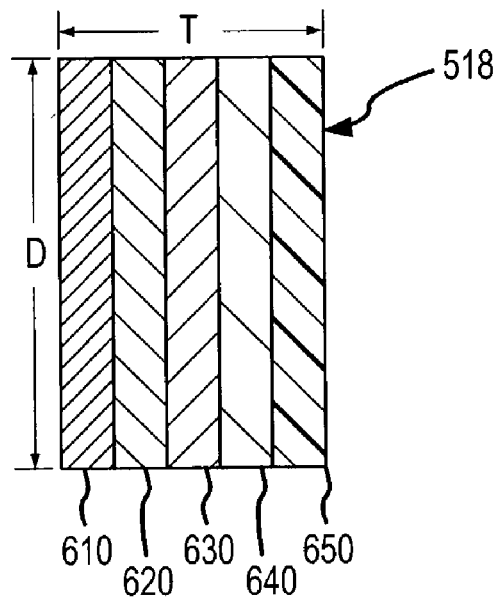
FIG. 6 is a sectional view of the thermosensor sensor element of FIG. 5 illustrating one multi-layer embodiment of sensor elements useful for fabricating the thermosensors of the invention.

The specific configuration of the thermosensors 248 may likewise be varied to practice the invention (with one exemplary configuration shown in FIGS. 5 and 6). Generally, the thermosensors 248 may contain any materials and layer or component arrangement that can be achieved in the micro dimensions of thinfilm head applications that acts to measure temperature. The thermosensors 248 each include two or more electrical conductors or conductive layers of dissimilar metals joined at about the point of heat application (such as the surface of the island 240 where island 240 contacts media 210). The choice of thermosensor or sensing layer materials can be widely varied with temperature-resistance or temperature-voltage relationships being determined and accounted for by the monitoring instrument to accurately determine sensed temperatures. A single monitoring instrument may used with the thermosensors connected in parallel and/or in series or more preferably, a monitoring instrument is attached to each thermosensor 248 to allow determination of the temperature at each thermosensor 248 location.

Figure 3:
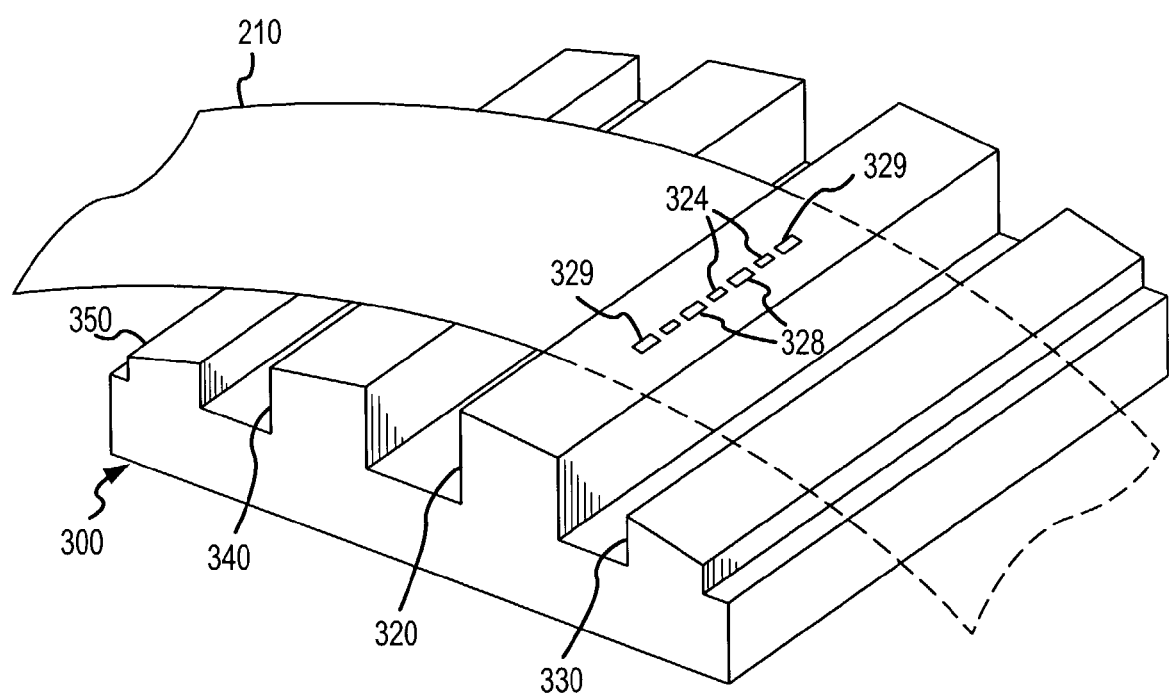
FIG. 3 is a view similar to FIG. 2 of another embodiment of a tape head according to the invention illustrating positioning of thermosensors on an active island of the tape head between or among the read/write elements of the head.

Referring now to FIG. 3, another tape head 300 is shown in which a different positioning of thermosensors is used to monitor interface temperatures. As shown, the head 300 again contacts tape 210 upon two inactive islands 330, 350 and active islands 320, 340. In this embodiment, though, read/write elements 324 are provided in active island 320 along with one or more thermosensors 328 inserted between or among the elements 324. The head 300 is adapted for directly monitoring the temperature on-site at each element 324 with the placement of an adjacent thermosensor 328. The thermosensors 328 are shown aligned along the island 320 with the elements 324, which enables the thermosensors 328 to be contacting the tape 210 at the same time and speed as the elements 324. The positioning among and specifically between adjacent pairs of elements 324 allows monitoring of the media interface developed on the head 300 under nearly identical operating conditions such as similar tape roughness and frictional forces, tape tension, air flow, and the like. This positioning further enhances stability monitoring by allowing measuring heat developed by read/write currents in elements 324 and island 320 (i.e., the thermosensors 328 are heated by the elements 324 themselves during operations).

Due to the method of manufacturing the island 320 and elements 324, it is preferable in this embodiment of head 300 that the thermosensors 328 include at least some of the layers and utilize the same materials used for the elements 324 for these common layers. Hence, although the thermosensors 328 are shown as being larger than the elements 324, the thermosensors 328 and elements 324 may have the same thickness (as measured along the tape travel path) as layers of similar materials are utilized. In other words, shared sputtering or other thinfilm fabrication processes are used to create the thermosensors 328 concurrently with elements 324. The number of thermosensors 328 may be varied from the illustrated embodiment 300. For example, a single thermosensor 328 may be provided to sense the interface temperature or more thermosensors 328 may be used than elements 324 with thermosensors 328 being provided on the ends or edges of the island 320 (e.g., enclosing the elements 324). Further, thermosensors may be provided in inactive island 330 as discussed with reference to head 200 of FIG. 2.

Lapping of heads is typically performed using electrical lapping guides that are positioned at outer edges of the elements 324 such as at the location of the thermosensors 329 and are used to measure resistively whether lapping of an island is occurring substantially equally along the island. The positioning of the thermosensors 329, hence, allows the thermosensors 329 to first function as lapping guides and then to function as thermosensors 329, thereby enhancing the efficiency of fabricating the head 300.

FIG. 4 illustrates yet another head 400 that can be used according to the invention to monitor interface temperatures with thinfilm thermosensors. As shown, the tape 210 again moves over active islands 420, 460 and inactive islands 450, 470 (that as shown contain no thermosensors but in some cases, thermosensors may be positioned in these islands 450, 470, too). As illustrated, the active island 420 is fabricated using modules that are epoxy-bonded together after thinfilm production processes are completed. As shown, the read/write elements 440 are formed in an inner island module 424 that is sandwiched between two outer modules 422, 426 including a thermosensor 430. Preferably, the island 420 is fabricated such that the thermosensors 430 are positioned to contact the media 210 and to be physically adjacent the most outer elements 440.

Although not necessary, the thermosensors 430 typically are positioned after bonding of modules 422, 424, 426 to be substantially aligned with the elements 440 along an axis of the elongated active island 420. The modular fabrication of island 420 is beneficial for allowing the thermosensors 430 and elements 440 to be fabricated from differing thinfilm materials in different thinfilm processes and in some cases, with differing numbers of layers of such materials. Again, thermosensors 430 can also be provided in inactive islands 450, 470 in some embodiments of head 400.

Additionally, the modular fabrication shown in FIG. 4 can be utilized with or combined with the embodiment shown in FIG. 3. For example, in one embodiment, the thermosensors 430 are included on inner module 424 rather than being fabricated separately on outer modules 422, 426. In this embodiment, the thermosensors 430 may be positioned adjacent the outer ones of the elements 440 (as shown in FIG. 4) or integrated between the elements 440 (as shown in FIG. 3 for thermosensors 328 between elements 324). As discussed relative to head 300, when fabricated in the same module 424, the thermosensors 430 and the elements 440 are typically manufactured with one or more thinfilm layers that are shared or made of like thinfilm materials with like thicknesses.

In some embodiments, the head 400 includes one or more sensor for sensing a reference temperature on the head 400, and more particularly on active or inactive islands, but outside of the head-media interface. Gathering information on a reference working temperature can then be used by a temperature monitoring instrument and/or tape drive controller (such as devices 530, 540 of FIG. 5) to compare head-media interface temperatures to general operating temperatures to determine when high head-media interface temperatures are being caused by operating parameters (which can then be altered) or simply by the overall temperatures or lack of cooling within the tape drive 10.

In this regard, FIG. 4 further illustrates thermosensors 431, 432 which are included to sense temperatures outside the head-media interface. In other words, the thermosensors 431, 432 are positioned on the active island 420 (and, in some embodiments, are placed on active island 460, too) in a location on the island 420 that does not contact media 210. The specific location on the island 420 may be varied to suit the anticipated widths of the media 210, e.g., to not be within the head-media interface for a range of media 210 widths. The thermosensors 431, 432 are shown to be positioned in outer modules 422, 426 which facilitates manufacturing of the thermosensors 431, 432 concurrently with the thermosensors 430 using similar manufacturing techniques and materials. Alternatively, reference-temperature thermosensors 431, 432 may be fabricated within a one-piece island, such as island, 220 of FIG. 2. In other embodiments not shown, reference thermosensors, similar to thermosensors 431, 432, are included on one or more of the inactive islands 450, 470 outside of the head-media interface and function to sense the temperature on the islands 450, 470 at locations not contacting the media 210.

FIG. 5 illustrates an interface temperature monitoring and drive control system 500 according to the invention. An RTD-type thermosensor 510 that may be utilized for thermosensors 248, 328, and 430 of FIGS. 2–4 is shown (with RTD-type and thermocouple-type thermosensors explained in more detail below). The thermosensor 510 includes a sensor 518 sandwiched between electrical leads 512, 514. Although the dimensions may vary to practice the invention, the thickness, T, is typically in the range of 600 to 900 Å such as about 750 Å, the width, W, is typically in the range of about 5 to 15 microns such as about 10 microns, and the depth is typically in the range of about 10 to 20 microns. The specific dimensions utilized are preferably selected to suit the specific island upon which the thermosensor 510 is positioned and whether the thermosensor 510 is positioned among or between read/write elements (in which case the width, W, is preferably minimized and the thickness, T, is selected to allow the thermosensor 510 to be produced with thinfilm processes used to produce the adjacent transducer elements).

In system 500, the leads are electrically connected to wire-bonding pads 522, 524 which in turn are electrically connected to the temperature monitoring instrument 530. For the thermocouple type of thermosensor, the monitoring instrument 530 senses a developed thermal electromotive force voltage and based on the materials properties and experimental data for the sensor 518 determines a corresponding temperature at the sensor 518. For the resistance temperature detector (RTD) type of thermosensor, the monitoring instrument 530 passes an electrical current into the thermosensor 510 and sensor 518 and senses the resistance change in the thermosensor 510. The instrument 530 preferably makes such determinations on an ongoing or nearly continuous basis and transmits a corresponding temperature or feedback signal to the tape drive controller 540. The tape drive controller 540 functions to control operations of components within a tape drive (such as tape drive 10 of FIG. 1). For example, the controller 540 may operate to control speeds of motors that move tape in the drive at tape speeds, speeds of cooling fans, tension of moving tape, and levels of read/write currents passed through read/write elements. During operation, the tape drive controller 540 preferably receives the temperature signals from instrument 530 and compares the corresponding temperature to a preset maximum or acceptable upper operating temperature for the head holding thermosensor 510.

For example, if degradation of the media is anticipated at 50° C., a preset maximum operating temperature may be set at 48° C. or some other temperature lower than the normal operation temperature limit. The controller 540 than compares sensed temperature or onsite temperature at sensor 518 with this preset and when the preset is exceeded or met, the controller 540 operates to increase the cooling fan speed, slow the tape speed by slowing tape drive motors, reduce the tape tension, and/or reduce the read/write current. Alternatively, different set points may be used for different control actions. For example, a first set point or comparison temperature may be used by controller 540 for controlling the cooling fan speed, a second, higher comparison temperature may then be used to slow down tape speed and to reduce tape tension, a third higher yet comparison temperature may then be used to decide when to reduce read/write currents, and a fourth maximum or shut off temperature may be used to determine when the tape drive is to be shut down to prevent damage to the tape and/or read/write elements. The controller 540 may also transmit the monitored temperature information to display devices on the tape drive containing the controller 540 or external to the drive, include the temperature information in periodically transmitted drive environment, and/or transmit an alarm signal upon preset points being met or exceeded at the sensor 518.

FIG. 6 illustrates one embodiment of the sensor 518 with a cross-sectional view of the sensor taken perpendicular to the tape travel path, i.e., looking along the length of an elongated island. As shown, the sensor 518 is a thinfilm device including multiple layers. The number of the layers may be varied to practice the invention and to suit any adjacent ones of the read/write elements. In the illustrated embodiment of the resistance temperature detector (RTD) type sensor 518, five layers 610, 620, 630, 640, and 650 are provided and each layer may comprise a different metal alloy or insulator material such as platinum, nickel, copper, nickel iron (NiFe), CZM, Ta, and the like. Additionally, the layers 610, 620, 630, 640, 650 may have different thickness or have substantially equal thickness as shown. In one specific embodiment of sensor 518, layer 610 is a cap layer formed of tantalum (Ta), layer 620 is an MR element formed of NiFe, layer 630 is a spacer formed of Ta, layer 640 is a SAL formed of CZM or NiFeRh, and layer 650 is an underlayer of Ta. With this exemplary makeup of sensor 518 provided, those skilled in the art be able to create other useful thermosensors 510 with differing layer materials and differing numbers of layers in the sensor 518.

The thermosensor 510 of FIGS. 5–6 are fabricated as a thinfilm resistance temperature detector (RTD), with an electrical thinfilm resistor (sensor 518) that changes resistance with temperature. The functional relationship between resistance change against temperature, which is called temperature coefficient of resistance (TCR), is well understood and is repeatable in practice. A number of thinfilm materials may be used for this resistor element 518 such as nickel iron alloy, platinum, nickel, copper, and the like. The advantages of using an RTD for thermosensor 510 include: good for applications where repeatability, linearity, and accuracy are important considerations (as is often required in tape drives); properly constructed thinfilm RTDs (such as platinum RTDs) have very repeatable resistance versus temperature characteristics over time; and RTDs are relatively interchangeable (e.g., replaceable) since their original variation is much lower than that of thermocouples. Thinfilm RTDs can produce several challenges, though, including: thinfilm processing costs can be higher as more layers are involved than in thermocouples (but this higher cost is low relative to overall head costs); and more precious wafer space may be used if additional 3-wire or 4-wire configurations are used to compensate for the leadwire resistance effect.

The configuration of thermosensor 510 is a 2-wire configuration in which the RTD leads 512, 514 are connected to 2 bonding pads 522, 524. Typically, although not shown, the RTD sensor 518 is connected to a typical Wheatstone bridge circuit. This simple configuration is desirable for using a small number of bonding pads and limiting the needed wafer real estate. In such an uncompensated circuit, the leadwire resistance from the RTD sensor 518 adds directly to the total resistance of the circuit as measured by temperature monitoring instrument 530. In other embodiments of the system 500 (not shown), 3 and 4-wire configurations may be used to provide higher accuracy but with the trade off of more leads, wires, and bonding pads which all can increase required wafer space and manufacturing complexity and cost. In 3-wire configurations or circuits, there are three leadwires coming from the RTD sensor 518 rather than two. Two leadwires on different ends of the sensor 518 carry the measuring current while the third leadwire act only as a potential lead. No current flows through the circuit as long as the bridge is in balance. The two leadwires carrying measuring current are in separate arms of the bridge, which causes leadwire resistance to be cancelled. The 3-wire circuit assumes resistance between the two measuring current leadwires are the same and such configuration generally matches resistance to within 5 percent. In 4-wire configurations or circuits, leadwire resistance is cancelled and the effects of mismatched resistances (such as at contacts) is removed. In the 4-wire circuit, one wire in each end of the sensor 518 carry precise measuring current while a second wire in each end is used to measure the voltage drop across the RTD sensor 518. 4-wire circuits are desirable for high accuracy sensor systems 500 and are better over longer distances than 2 and 3-wire configurations of system 500.

In addition to RTD-type thermosensors, the thermosensors of the invention (shown positioned in FIGS. 1–4) can be implemented as thinfilm thermocouples. Using a thinfilm thermocouple for the sensing element (such as element 518) can be useful for high temperature environments (which are typically not seen in tape drives) and can implemented at lower costs because thinfilm processing of two layers is all that is needed rather than the multiple layers typically used for RTD thermosensors. Thermocouples, on the other hand, are typically less repeatable and have less accuracy. Further accuracy losses often occur due to the increasing number of dissimilar material multi-junction connections with potential temperature gradients between the thinfilm thermocouple and the temperature controller or instrument (such as instrument 530), e.g., bondpad to wire, wire to flexcable bondpad, flexcable copper trace to connector, connector to connector, and connector to temperature controller circuit board. Additionally, many thinfilm thermocouples may be fabricated using different materials from the magnetoresistive reader, which leads to the use of epoxy bonding techniques or increasing the complexity of the wafer (as compared to an RTD thermosensor).

If thinfilm thermocouples are used for the thermosensors of the invention, the heads 200 and 400 of FIGS. 2 and 4 are typically preferred because these heads 200, 400 support the use of separate manufacturing processes for the thermosensors and the read/write elements (as previously discussed with the use of RTD thermosensors). When implemented as thermosensors (such as thermosensor 510 of FIG. 5), each thinfilm thermocouple sensor 518 contains two electrical conductors made of different thermal electromotive force materials which are connected in the head near the TBS and generally, exposed to the head-media interface. The exposed end of the conductors is called the measurement junction and the other ends of the conductors where the conductors connect to the temperature monitoring instrument (such as instrument 530) through the wire bonding pads (such as pads 522, 524) is called the reference junction. When the measurement and reference junctions of a thermocouple are at different temperatures, a potential (such as a millivolt potential) is formed within the conductors. The magnitude of the millivolt potential generated is a function of the thermal emf material composition and the metallurgical structure of the conductors.

The contact area between the two dissimilar materials is preferably made relatively small and thin to reduce the thermal mass and to increase sensitivity. Typically, each thermocouple is formed with two layers of dissimilar material that only overlap at the contact area, which can take a variety of shapes to practice the invention. The following are just a few of the pairs of materials that can be used to form the thinfilm thermocouple conductor layers: copper/Constantan (i.e., an alloy of 55 percent copper and 45 percent nickel); iron/Constantan; copper/alloy of Ni (such as 90 percent) and Cr (such as 10 percent); platinum/alloy of platinum and rhodium; platinum/palladium; and rhodium/iridium. Either of the thinfilm conductor layers can be applied first during thinfilm processing, with insulator layers being provided as needed or as useful for producing the thinfilm thermocouple (e.g., a low dielectric material such as polyamide). Formation of thinfilm thermocouples can be completed in a number of ways including photolithographic techniques, sputtering, spinning, chemical etching and electroplating, adhesive spraying, and lamination.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A thinfilm magnetic head for writing to and reading from magnetic recording tape, comprising:
    a media interface contacting a data bearing surface of the tape as the tape is moved over the head;
    a thinfilm transducer element for reading or writing to the tape, wherein the transducer element is positioned in the media interface; and
    a thermosensor including a thinfilm sensor positioned in the media interface, the thermosensor adapted for generating a signal based on a temperature of the media interface sensed by the sensor, wherein the media interface further comprises an elongated inactive island positioned transverse to the travel path to contact the data bearing surface of the tape and wherein the thinfilm sensor of the thermosensor is positioned in a portion of the inactive island contacting the data bearing surface of the tape.

2. The thinfilm magnetic head of claim 1, wherein the media interface comprises an elongated active island positioned transverse to a travel path for the tape to contact the data bearing surface of the tape, wherein the transducer element is positioned in the active island.

3. The thinfilm magnetic head of claim 1, wherein the thinfilm sensor is positioned on the inactive island such that a portion of the data bearing surface of the tape contacting the thinfilm sensor also passes over the transducer element.

4. The thinfilm magnetic head of claim 1, wherein the thinfilm sensor has a thickness as measured substantially perpendicular to the media interface less than about 900 Å.

5. A thinfilm magnetic head for writing to and reading from magnetic recording tape, comprising:
   a media interface contacting a data bearing surface of the tape as the tape is moved over the head;
   a thinfilm transducer element for reading or writing to the tape, wherein the transducer element is positioned in the media interface; and
   a thermosensor including a thinfilm sensor positioned in the media interface, the thermosensor adapted for generating a signal based on a temperature of the media interface sensed by the sensor, wherein:
   the media interface comprises an elongated active island positioned transverse to a travel path for the tape to contact the data bearing surface of the tape, wherein the transducer element is positioned in the active island, and
   the active island includes an inner module comprising thinfilm layers and an outer module comprising thinfilm layers and wherein the transducer element is positioned in the inner module and the thinfilm sensor is positioned in the outer module.

6. The thinfilm magnetic head of claim 5, wherein the thinfilm sensor is positioned in a portion of the active island contacting the data bearing surface of the tape.

7. The thinfilm magnetic head of claim 6, further including another transducer element positioned in the active island and wherein the thinfilm sensor is position between the two transducer elements.

8. The thinfilm magnetic head of claim 7, wherein the thinfilm sensor comprises a plurality of thinfilm material layers and the transducer elements comprise a plurality of thinfilm material layers and wherein at least one layer of the thinfilm sensor comprises a material in an adjacent layer of the transducer elements.

9. The thinfilm magnetic head of claim 8, wherein the one layer material is an alloy selected from the group of alloys consisting of nickel iron, platinum, and copper.

10. The thinfilm magnetic head of claim 5, wherein the thinfilm layers of the outer module differ from the thinfilm layers of the inner module such that the thinfilm sensor comprises at least one thinfilm layer differing from an adjacent thinfilm layer in the transducer element.

11. The thinfilm magnetic head of claim 5, wherein the sensor is positioned in the active island and the thermosensor is integrated with an electrical lapping guide on the active island.

12. A temperature monitoring and feedback system for use in a magnetic tape drive for monitoring temperature a thinfilm magnetic tape head at an interface with a magnetic media, comprising:
   a thinfilm read or write element on the tape head for reading or writing data to a data bearing surface of the magnetic media;
   a thermosensor with a sensor of thinfilm material layers on the tape head for sensing a temperature of the head at a portion of the head contacting the data bearing surface and in response, generating a signal based on the sensed temperature, wherein the thermosensor includes three leadwires; and
   a temperature monitoring instrument receiving the thermosensor signal and in response, transmitting a temperature feedback signal.

13. The system of claim 12, a tape drive controller receiving the temperature signal, comparing the temperature signal to an operating set point temperature, and based on the comparing, operating a component of the tape drive.

14. The system of claim 13, wherein the component is a cooling fan and the operating includes increasing a speed of the cooling fan.

15. The system of claim 13, wherein the component is a tape drive motor for moving the magnetic media over the head and the operating includes decreasing a speed of the motor.

16. The system of claim 13, wherein the component is a read or write current controller for controlling a magnitude of read or write current passed through the transducer element and the operating includes reducing the magnitude of the read or write current.

17. The system of claim 12, wherein the tape head includes an elongated, raised island positioned on the tape head such that a longitudinal axis is transverse to a travel path for the magnetic media and wherein the thinfilm read or write element and the thermosensor are positioned on an upper contact surface of the island to contact the data bearing surface.

18. The system of claim 13, wherein the thermosensor includes four leadwires.

19. A tape head for writing to and reading from magnetic recording tape, comprising:
   an elongated active island positioned transverse to a travel path for the tape to contact a data bearing surface of the tape as the tape is moved over the active island;
   a plurality of thinfilm transducer elements for reading or writing to the tape, wherein the transducer elements are positioned in the active island; and
   a thermosensor positioned in a media interface in the active island and configured to generate a signal based on a temperature of the thermosensor, wherein the thermosensor comprises a thermocouple with two layers of differing thinfilm material contacting at a contact area.

20. The tape head of claim 19, wherein the thermosensor is configured as a thinfilm resistance temperature detector having at least one metallic thinfilm layer.

21. The tape head of claim 20, wherein the active island comprises at least two adjacent structural members and wherein the thinfilm transducer elements and the thermosensor are positioned in a same one of the structural members.

22. The tape head of claim 21, wherein the thermosensor is positioned between two of the thinfilm transducer elements.

23. The tape head of claim 19, further including additional ones of the thermosensors for sensing temperature at differing locations in the tape head.

24. The tape head of claim 23, wherein at least one of the additional ones of the thermosensors is positioned on the active island outside the travel path for the tape to sense a reference operating temperature for the tape head.

25. The tape head of claim 19, further including an elongated inactive island positioned transverse to the travel path for the tape to contact the data bearing surface of the tape and including an additional thermosensor positioned in the inactive island.

26. The tape head of claim 19, further including an electrical lapping guide, wherein the thermosensor is integral to the lapping guide, whereby the thermosensor provides lapping feedback signals during head surface finishing processes and provides signals indicative of temperature during operational use of the tape head.

27. A thinfilm magnetic head for writing to and reading from magnetic recording tape, comprising:
- a media interface contacting a data bearing surface of the tape as the tape is moved over the head;
- a thinfilm transducer element for reading or writing to the tape, wherein the transducer element is positioned in the media interface; and
- a thermosensor including a thinfilm sensor positioned in the media interface, the thermosensor adapted for generating a signal based on a temperature of the media interface sensed by the sensor, wherein the thermosensor includes three leadwires.

28. The thinfilm magnetic head of claim 27, wherein the thermosensor includes four leadwires.

29. A tape head for writing to and reading from magnetic recording tape, comprising:
- an elongated active island positioned transverse to a travel path for the tape to contact a data bearing surface of the tape as the tape is moved over the active island;
- a plurality of thinfilm transducer elements for reading or writing to the tape, wherein the transducer elements are positioned in the active island; and
- a thermosensor positioned in a media interface in the active island and configured to generate a signal based on a temperature of the thermosensor, wherein the thermosensor includes three leadwires.

30. The tape head of claim 29, wherein the thermosensor includes four leadwires.

* * * * *